United States Patent
Ren et al.

(10) Patent No.: US 10,171,857 B2
(45) Date of Patent: Jan. 1, 2019

(54) NETWORK DATA DELIVERY SPONSORSHIP SIGNATURES IN STREAMING MANIFEST FILES

(71) Applicant: Verizon Patent and Licensing Inc., Arlington, VA (US)

(72) Inventors: Dahai Ren, Lincoln, MA (US); Yuhui Qian, Lexington, MA (US); Ming Chen, Bedford, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/426,092

(22) Filed: Feb. 7, 2017

(65) Prior Publication Data

US 2018/0227616 A1 Aug. 9, 2018

(51) Int. Cl.
*H04N 21/2543* (2011.01)
*H04N 21/2662* (2011.01)
*H04N 21/85* (2011.01)
*H04N 21/61* (2011.01)
*H04N 21/81* (2011.01)
*H04N 21/2547* (2011.01)

(52) U.S. Cl.
CPC ... *H04N 21/25435* (2013.01); *H04N 21/2547* (2013.01); *H04N 21/2662* (2013.01); *H04N 21/6125* (2013.01); *H04N 21/812* (2013.01); *H04N 21/85* (2013.01)

(58) Field of Classification Search
CPC ........... H04N 21/454; H04N 21/25435; H04N 21/2547; H04N 21/2662; H04N 21/6125; H04N 21/812; H04N 21/85
See application file for complete search history.

(56) References Cited

U.S. PATENT DOCUMENTS

| | | | | |
|---|---|---|---|---|
| 2003/0206632 A1* | 11/2003 | Itoh | ........................ | H04H 20/28 380/231 |
| 2010/0058376 A1* | 3/2010 | Alhadeff | ................ | H04H 60/31 725/10 |
| 2011/0064388 A1* | 3/2011 | Brown | .................... | G06T 13/20 386/285 |
| 2011/0239253 A1* | 9/2011 | West | ................ | H04N 21/23436 725/46 |
| 2016/0044374 A1* | 2/2016 | Ren | .................. | H04N 21/44016 725/34 |
| 2017/0061505 A1* | 3/2017 | Thramann | ......... | G06F 17/30053 |

* cited by examiner

*Primary Examiner* — Hunter B Lonsberry

(57) ABSTRACT

A device receives, via a Public Land Mobile Network (PLMN), a manifest file associated with streaming content, wherein the manifest file includes a sequence of multiple Uniform Resource Identifiers (URIs) that identify network storage locations of multiple content segments of the streaming content, and wherein a sponsorship signature of multiple sponsorship signatures is appended to at least one of the multiple URIs of the manifest file. The device retrieves the multiple URIs, and the sponsorship signature, from the manifest file; sends the sponsorship signature to a charging node in the PLMN for controlling the charging of data delivery associated with the streaming content to one of a user of the media playing device or a sponsor of the streaming content based on the sponsorship signature; and engages, via the PLMN using the multiple URIs, in a content streaming session to receive the streaming content.

20 Claims, 14 Drawing Sheets

SPONSORSHIP SIGNATURE TABLE 250

| | Sponsorship Signature (255) | Sponsorship Discount Factor (260) | Type of Content Segment (265) |
|---|---|---|---|
| 270-1 → | A | 100% | High Resolution Advertisement |
| 270-2 → | B | 100% | Low Resolution Advertisement |
| 270-3 → | C | 80% | High Resolution Normal Content |
| 270-4 → | D | 50% | Low Resolution Normal Content |

SPONSORSHIP
SIGNATURE TABLE
250

| Sponsorship Signature | Sponsorship Discount Factor | Type of Content Segment |
|---|---|---|
| A | 100% | High Resolution Advertisement |
| B | 100% | Low Resolution Advertisement |
| C | 80% | High Resolution Normal Content |
| D | 50% | Low Resolution Normal Content |

255 → Sponsorship Signature
260 → Sponsorship Discount Factor
265 → Type of Content Segment 270-1, 270-2, 270-3, 270-4

FIG. 2B

NETWORK DATA DELIVERY SPONSORSHIP SIGNATURES IN STREAMING MANIFEST FILES

BACKGROUND

Adaptive bitrate streaming (ABS) is a technique used for both live and on-demand (e.g., video-on-demand (VOD)) content streaming. Examples of ABS include Hypertext Transfer Protocol (HTTP) Live Streaming (HLS), Smooth Streaming, HTTP Dynamic Streaming (HDS), and Moving Picture Experts Group-Dynamic Adaptive Streaming over HTTP (MPEG-DASH). ABS encodes an item of content (e.g., a video file) into multiple desired bitrate streams, and segments each bitrate stream into a sequence of small chunks or segments (e.g., of seconds in length). A file, called a manifest file or playlist file, is used to specify information of available streams and variant bitrates for the item of streaming content, and also specifies the HTTP locations of the chunks or segments of the item of streaming content. The media player retrieves the manifest or playlist file, identifies an acceptable variant bitrate based on resource constraints such as network bandwidth and local CPU capacity, retrieves the HTTP locations of the chunks or segments, and uses the retrieved HTTP locations of the chunks or segments to further retrieve the sequence of content segments. The media player, during playback, may switch between streams of variant bitrates based on changes in real-time resource constraints, such as changes in current network bandwidth or current CPU capacity.

HLS is one example of an ABS streaming protocol. HLS is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the media playing client downloads a playlist file that specifies the different or alternate streams that are available. In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a media playing client first obtains the playlist file, and then obtains and plays each media file in the playlist in sequence. In HLS, the playlist is organized as set forth in the Internet Draft of "HTTP Live Streaming" dated Nov. 19, 2010.

BRIEF DESCRIPTION OF THE DRAWINGS

FIG. 2B depicts an exemplary sponsorship signature table that maps sponsorship signatures to corresponding sponsorship discount factors and types of content segments;

DETAILED DESCRIPTION OF THE PREFERRED EMBODIMENTS

Figure 1A:
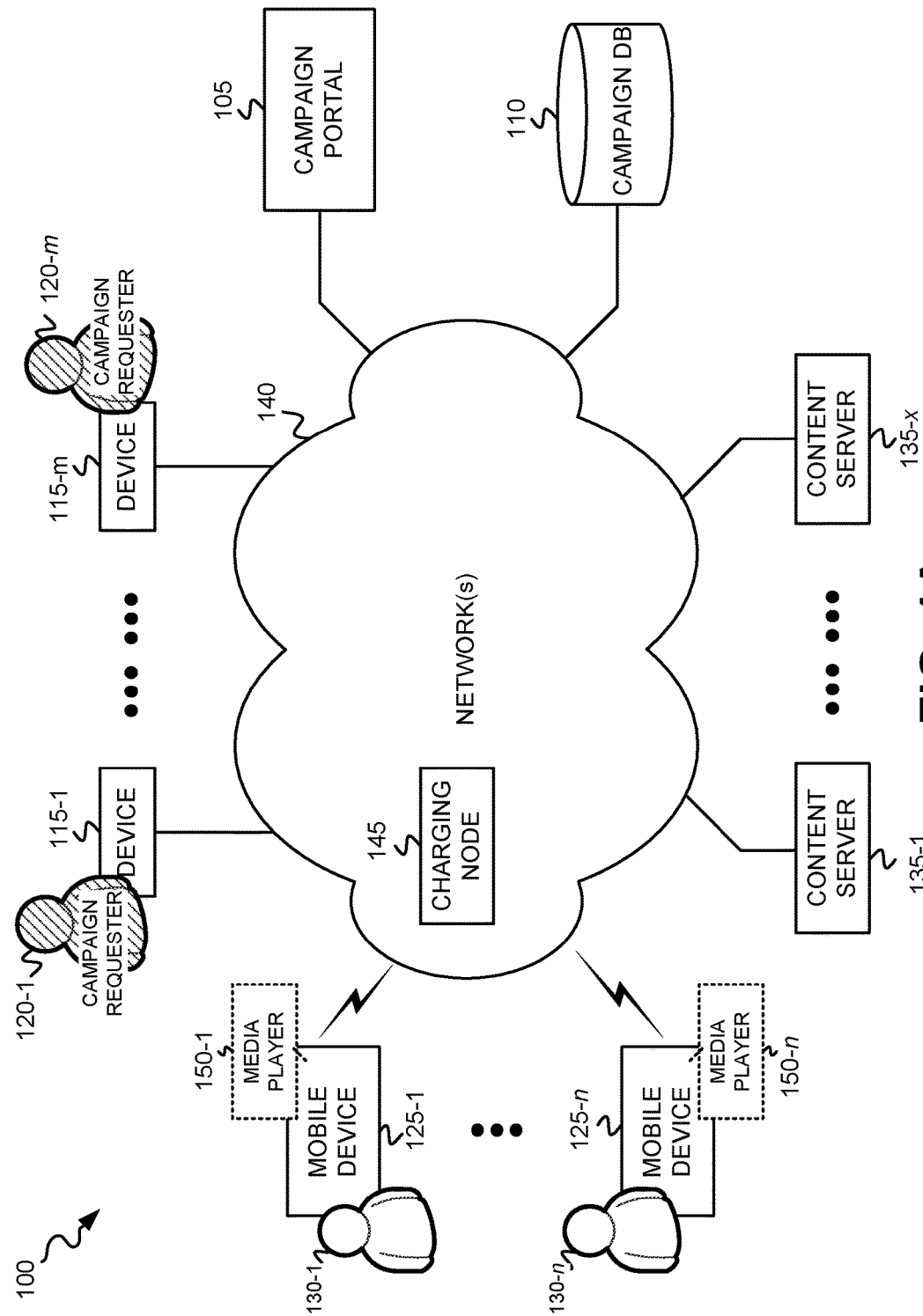
FIG. 1A illustrates an exemplary network environment in which sponsored content may be accessed by mobile devices such that the sponsored content is delivered to the mobile devices without associated network data delivery charges, or with reduced data delivery charges, being charged to the users of the mobile devices.

The following detailed description refers to the accompanying drawings. The same reference numbers in different drawings may identify the same or similar elements. The following detailed description does not limit the invention.

Exemplary embodiments described herein implement processes associated with "toll-free," or "reduced toll," data delivery campaigns that enable mobile users to access content hosted by content servers via their serving networks (e.g., Public Land Mobile Networks) without incurring network data delivery charges, or with only incurring a reduced level of data delivery charges, for specific sponsored content. A "toll-free campaign," as described herein, refers to content, hosted by a content server and sponsored by a campaign requester, that, using processes described herein, is accessible by a mobile user without incurring a network data delivery charge, or other charges associated with data usage for a period of time defined by the campaign requester, for a certain amount of data usage per mobile user or global data usage for a group of mobile users, and/or for a certain amount of cost associated with data usage per mobile user or global data usage for the group of mobile users. A "reduced toll campaign," as described herein, refers to content, hosted by the content server and sponsored by a campaign requester that, using processes described herein, is accessible by a mobile user while incurring a reduced network data delivery charge, or other reduced charges associated with data usage for a period of time defined by the campaign requester, for a certain amount of data usage per mobile user or global data usage for a group of mobile users, and/or for a certain amount of cost associated with data usage per mobile user or global data usage for the group of mobile users. For example, during a content streaming session involving sponsored content that is part of a reduced toll campaign, a mobile device user may be charged only 70% of the typical data usage charged to the user for the same amount of content. As described herein, various different levels of reduced toll charges may be applied to sponsored content based on the type of the content (e.g., regular content or advertisement content), the bitrate at which the content is delivered, and/or the resolution of the delivered content.

To implement toll-free or reduced toll data delivery campaigns, as described herein, multiple different sponsorship signatures may be used to identify content segments within a data delivery stream that is part of a toll-free or reduced toll campaign. The multiple different signatures may be based on the type of the content (e.g., regular content or advertisement content), the bitrate at which the content is delivered, and/or the resolution of the delivered content. A given sponsorship signature may be inserted into an ABS manifest file for a particular item of content to indicate that the associated content segment or segments, identified in the manifest file, are sponsored as part of a toll-free/reduced toll campaign. Each different sponsorship signature identifies a different level of toll-free or reduced toll sponsorship. For example, a sponsorship signature of "A" or "B" indicates that content segments of the associated content receive a 100% sponsorship discount factor and, thus, are received by the mobile user with no data charge being applied to the user's account. As another example, a sponsorship signature of "C" indicates that content segments of the associated content receive an 80% sponsorship discount factor and, therefore, are received by the mobile user with an 80% reduction in data charges being applied to the user's account. As an additional example, a sponsorship signature of "D" indicates that content segments of the associated content receive a 50% sponsorship discount factor and, thus, are received by the mobile user with a 50% reduction in data charges being applied to the user's account.

To establish a toll-free, or reduced toll, campaign, a campaign requester accesses a governing network device (e.g., a campaign portal), and allocates a budget to the toll-free or reduced toll campaign, where the budget may include a data transfer maximum in Megabytes or Gigabytes, and/or a data delivery cost maximum (e.g., in dollars). When a mobile user attempts to access, via a mobile device, content that is associated with a toll-free or reduced toll campaign, the user's mobile device obtains an ABS manifest file for the content, and retrieves the sponsorship signature(s) inserted into the ABS manifest file. The mobile device sends the retrieved sponsorship signature along with other information that enables identification of the content, to a charging node in the external network. The charging node ensures that, when the content is streamed to the mobile user, an appropriate sponsorship discount factor is used to determine data usage charges applied to the mobile user's account.

As referred to herein, a Uniform Resource Locator (URL) is a type of Uniform Resource Identifier (URI) which includes a reference to a web resource that further specifies a location of the web resource on a computer network and a mechanism for retrieving the web resource. A typical URL may have the form http://www.example.com/file.html, which specifies a protocol (hypertext transfer protocol (http)), a hostname (www.example.com), and a file name (file.html). Web browsers, other types of applications (apps), or other network devices, use the URL of the web resource (e.g., video content) for accessing a manifest file associated with the web resource at a remote server, and downloading the manifest file, from the remote server for streaming by the web browser, or other types of apps, using information contained in the manifest file.

FIG. 1A illustrates an exemplary network environment 100 in which sponsored content may be accessed by mobile devices such that the sponsored content is delivered to the mobile devices without associated network data delivery charges being applied to the users of the mobile devices, or with reduced data delivery charges being applied to the users of the mobile devices. Network environment 100 includes a campaign portal 105, a campaign database (DB) 110, multiple devices 115-1 through 115-*m* associated with respective campaign requesters 120-1 through 120-*m*, multiple mobile devices 125-1 through 125-*n* associated with respective mobile users 130-1 through 130-*n*, multiple content servers 135-1 through 135-*x*, and a network(s) 140 that further includes a charging node 145.

Campaign portal 105 includes one or more network devices that receive campaign information for setting up toll-free, or reduced toll, data campaigns for content hosted by content servers 135-1 through 135-*x*. Campaign database (DB) 110 includes one or more network devices that store data structures that include toll-free or reduced toll data campaign information. Campaign portal 105 and/or charging node 145 may access and retrieve the campaign information stored by campaign DB 110.

Devices 115-1 through 115-*m* (generically referred to herein as "device 115" or "devices 115") may include any type of digital computing device that has a capability to communicate with campaign portal 105 or content servers 135 via network(s) 140. Devices 115 may each include, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA).

Mobile devices 125-1 through 125-*n* (generically referred to herein as "mobile device 125" or "mobile devices 125") may include any type of digital computing device that has a capability to wirelessly communicate with campaign portal 105, content servers 135, or charging node 145 via network(s) 140. Mobile devices 125 may each include, for example, a cellular telephone (e.g., a smart phone); a wireless laptop, palmtop or tablet computer; a wireless wearable computer device (e.g., a wrist watch, glasses, etc.); a vehicle mounted wireless telephone; or a wireless personal digital assistant (PDA).

As shown in FIG. 1A, mobile devices 125-1 through 125-*n* have respective media players 150-1 through 150-*n* (referred to herein as "media player 150" or "media players 150") installed locally. Each of media players 150 includes functionally for obtaining a URL for accessing content at one of content servers 135, requesting a manifest file associated with the content at the URL, and receiving ABS streaming content from the content servers 135 through use of information contained in the manifest file. Each of media players 150 may include software, hardware, or a combination of software and hardware. In an implementation in which media player 150 is software, media player 150 may be pre-installed on mobile device 125, or may be downloaded and installed on mobile device 125.

Content servers 135-1 through 135-*x* (generically referred to herein as "content server 135" or "content servers 135") may include one or more network devices that host digital content such as, for example, web pages, images, audio content, video content, ABS streaming content (i.e., ABS content segments). Content servers 135 may permit the access and retrieval of hosted content by mobile devices 125 and/or devices 115, as described further herein. Content server 135-1 through 135-x may store, at certain URLs, manifest files that include the information needed to access content segments of ABS streaming content.

Network(s) 140 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). In one implementation, network(s) 140 may include a PLMN or satellite mobile network connected to the Internet.

Charging node 145 may include one or more network devices, or a portion of a single network device, located in network(s) 140 that receives sponsorship signatures associated with requested streaming content from mobile devices 125-1 through 125-n. Charging node 145 additionally meters data associated with sessions corresponding to the requested streaming content, determines if sponsored campaigns corresponding to the requested streaming content are currently valid, designates the metered data as either free or as reduced toll to the mobile user based on received sponsorship signatures, and charges metered data to either the mobile user 130 and/or to appropriate sponsored campaigns.

The configuration of the components of network environment 100 depicted in FIG. 1A is for illustrative purposes only, and other configurations may be implemented. Therefore, network environment 100 may include additional, fewer and/or different components, that may be configured differently, than depicted in FIG. 1A. For example, though a single charging node 145 is depicted in FIG. 1A, multiple different charging nodes 145 may be located in the network(s) 140 (e.g., a PLMN or a satellite mobile network) to, for example, serve mobile devices 125 at numerous different geographic locations that are covered by the network(s) 140.

Figure 1B:
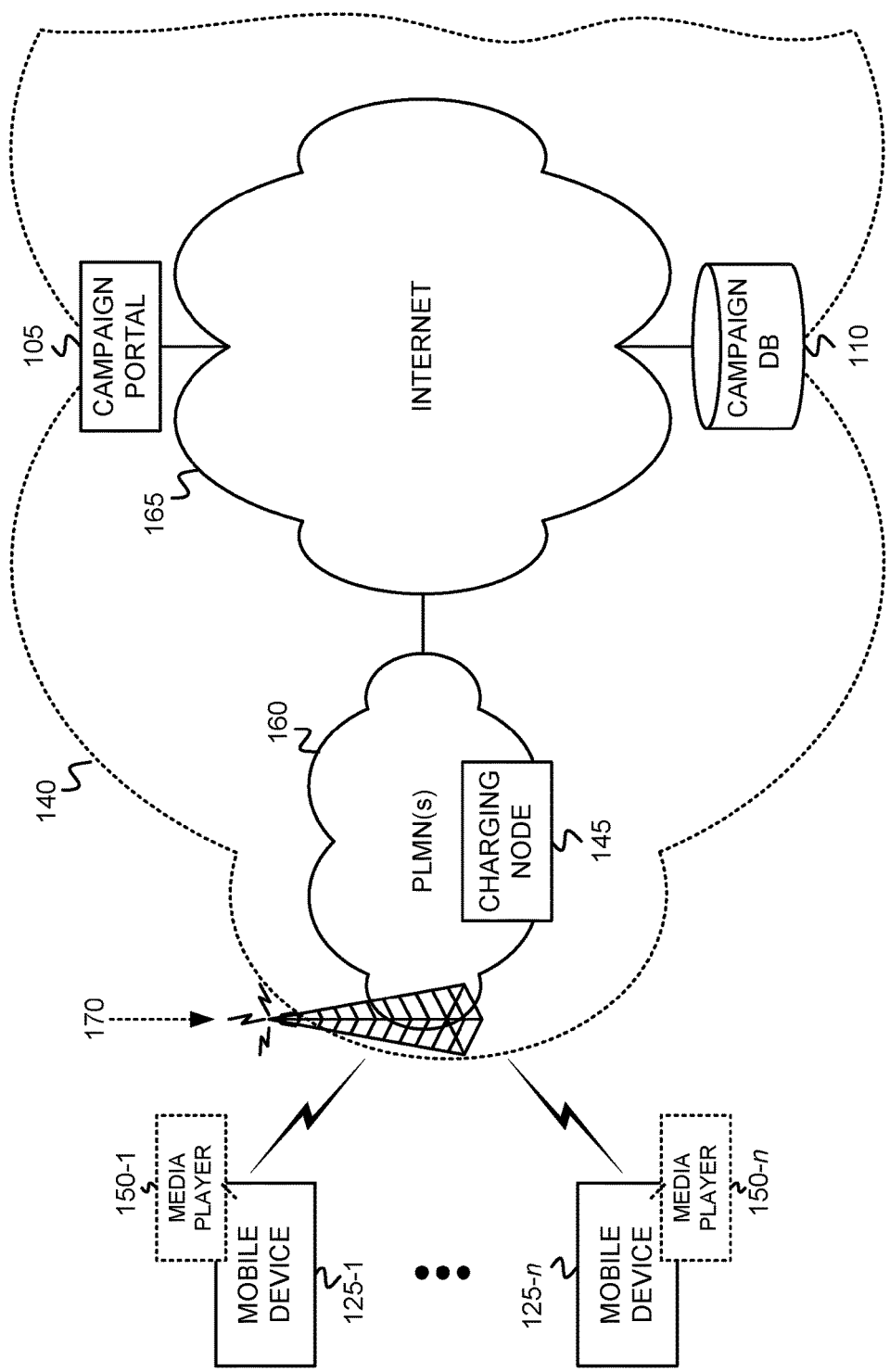
FIG. 1B depicts an exemplary implementation of the network environment of FIG. 1A in which the depicted network includes a Public Land Mobile Network(s) connected to the Internet.

FIG. 1B depicts an exemplary implementation of the network environment 100 of FIG. 1A in which network 140 includes a PLMN(s) 160 connected to the Internet 165. As shown in FIG. 1B, charging node 145 may be a component of PLMN(s) 160. As further shown, campaign portal 105 and campaign DB 110 may connect to Internet 165. Though not depicted in FIG. 1B, devices 115-1 through 115-m and content servers 135-1 through 135-x, of FIG. 1A, may further connect to Internet 165 via wired or wireless connections.

Referring to FIG. 1B, outgoing data transmitted from mobile devices 125 is received via an antenna of a wireless cell tower 170 of PLMN(s) 160, and then forwarded on to other components of PLMN(s) 160 (not shown) that, in turn, forward the data to its intended destination in PLMN(s) 160, and/or to its intended destination in the Internet 165 via an interconnection between PLMN(s) 160 and the Internet 165 (or to its intended destination in another destination network in network(s) 140).

Furthermore, data transmitted from other devices/nodes in PLMN(s) (not shown), or from campaign portal 105 or other devices/nodes in Internet 165 (e.g., content servers 135-1 through 135-x), that is destined for one of mobile devices 125-1 through 125-n, may pass, via the interconnection between Internet 165 and PLMN(s) 160, from Internet 165 to PLMN(s) 160. Upon entry into PLMN(s) 160, various nodes within PLMN(s) 160 (e.g., Serving Gateway (SGW) and/or Packet Data Network Gateway (PDN GW)) may route and forward the data towards an appropriate wireless cell tower 170 of PLMN(s) 160 that currently serves the destination mobile device 125. When the data is received at wireless cell tower 170, wireless cell tower 170 transmits the data, using cellular protocols over the wireless interface, to the destination mobile device 125. During data transmission from a mobile device 125, and data transmission to the mobile device 125, charging node 145 may meter the data to maintain a record of, for example, a quantity of data (i.e., data usage) received from, or delivered to, the mobile device 125 via PLMN(s) 160.

Figure 2A:
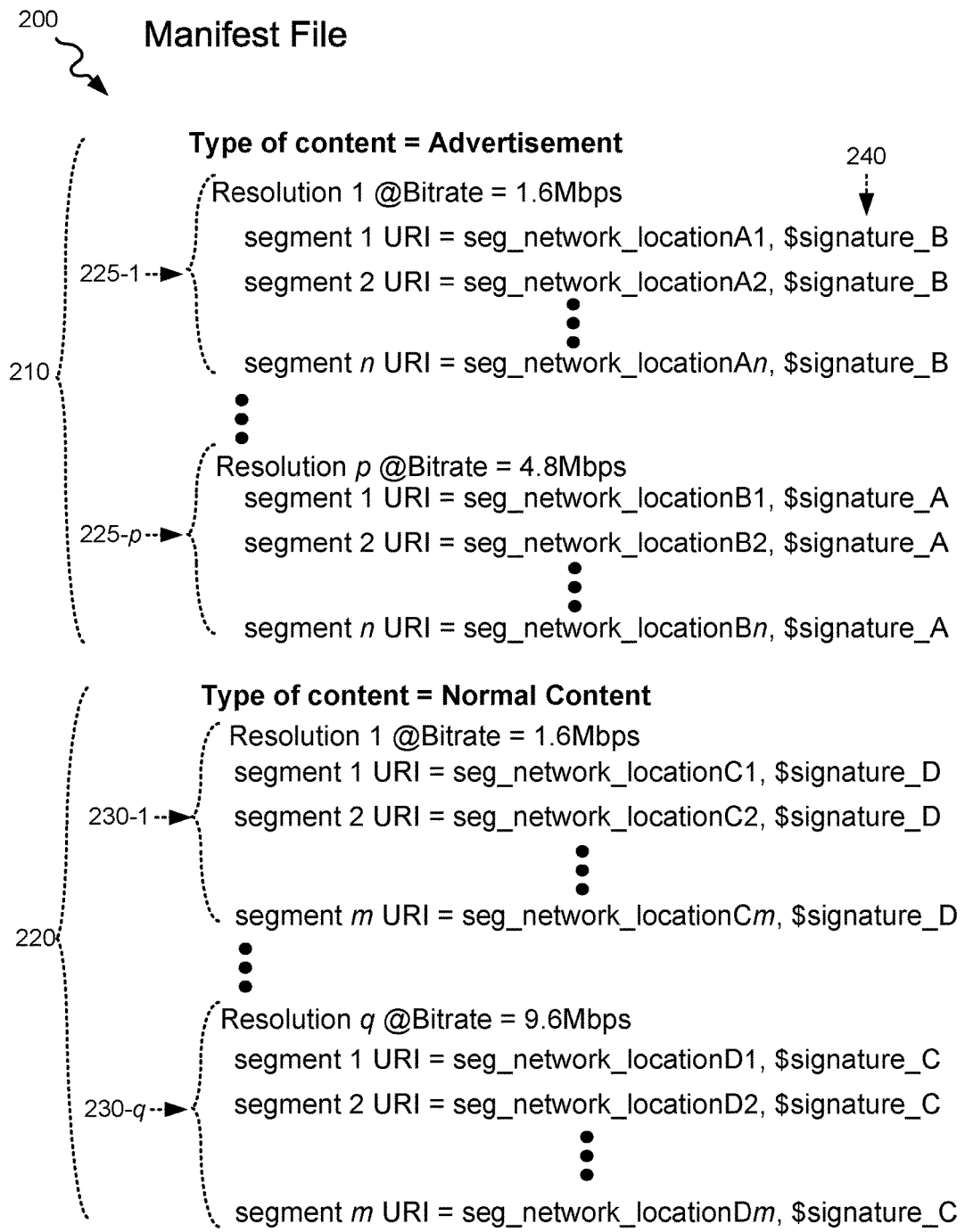
FIG. 2A depicts an exemplary manifest file that may be used by a media player for accessing and streaming content from a content server depicted in FIG. 1A.

FIG. 2A depicts an exemplary manifest file 200 that may be used, as described herein, by a media player 150 for accessing and streaming content from a content source such as, for example, a content server 135. Manifest file 200 may include any type of manifest or playlist file used for content streaming by any type of streaming protocol, including HLS, Smooth Streaming, HDS, and MPEG-DASH. In one implementation, manifest file 200 may include an extensible markup language (XML) metadata file. Manifest file 200 may include various types of data for identifying a type of the content to be streamed, identifying the resolution/bitrate(s) at which the content may be streamed, identifying the URIs of the content segments, and designations of the sponsorship signatures that apply to each of the content segments. As shown, manifest file 200 may include a first data section 210 for a first type of content and a second data section 220 for a second type of content. In the depicted exemplary manifest file 200, the first type of data of first data section 210 includes advertisement data and the second type of data of second data section 220 includes normal video content.

First data section 210 includes corresponding data identifying multiple different resolutions and/or bitrates 225-1 through 225-p (where p is greater than or equal to 1) that are available for streaming for the first type of data. Within each identified resolution/bitrate 225 for the given first type of content, manifest file 200 further includes data identifying the URI of each segment (seg_network_location) at the particular resolution, of multiple content segments, that, when played back in sequence, constitute the entire content.

Second data section 220 includes corresponding data identifying multiple different resolutions/bitrates 230-1 through 230-q (where q is greater than or equal to one) that are available for streaming for the second type of data. Within each identified resolution/bitrate 230 for the given second type of content, manifest file 200 further includes data identifying the URI of each content segment (seg_network_location) at the particular resolution, of multiple content segments, that, when played back in sequence, constitute the entire content.

In addition to the data identifying the URI of each content segment of the various resolution/bitrate versions of the content, a sponsorship signature 240 may be associated with each content segment URI. For example, campaign portal 105 may obtain manifest file 200, and inject, or append, appropriate sponsorship signatures 240 into manifest file 200 in conjunction with each content segment. Insertion of "$" in combination with a content segment URI indicates that the data that follows the "$" includes a sponsorship signature. Therefore, "$" may be followed by sponsorship signatures, such as "signature_A," "signature_B," "signature_C," and "signature_D." "signature_A" identifies a sponsorship discount factor of A applying to the corresponding content segment. "signature_B" identifies a sponsorship discount factor of B applying to the corresponding content segment. "signature_C" identifies a sponsorship discount factor of C applying to the corresponding content segment. "signature_D" identifies a sponsorship discount factor of D applying to the corresponding content segment. Examples of different sponsorship signatures are further described with respect to FIG. 2B below.

When a media player 150 at a mobile device 125 retrieves a manifest file 200 from a URL corresponding to the content (e.g., a video) requested by the user at mobile device 125, media player 150 identifies the type of content, and an appropriate resolution/bitrate, to be presented at mobile device 125. Media player 150 then retrieves the content segment URIs from the data section of manifest file 200 (i.e., section 225 or 230) that corresponds to the identified type of content, and the identified resolution/bitrate. Media player 150 proceeds to request each content segment URI from the content hosting device (e.g., content server 135), receives each streamed content segment, and then plays back the content segments in the order specified in the manifest file 200 (i.e., segment 1, segment 2, segment 3, and so on).

FIG. 2B depicts an exemplary sponsorship signature table 250 that maps sponsorship signatures to corresponding sponsorship discount factors and types of ABS streaming content segments. Table 250 may be stored, for example, at charging node 145 and/or at campaign portal 105. In some implementations, table 250 may be applied globally to all sponsored content sponsored by campaign requesters 120-1 through 120-m. In other implementations, a different table 250 may be associated with each different sponsoring entity (i.e., each campaign requester 120). As shown, sponsorship signature table 250 includes multiple fields, including a sponsorship signature field 255, a sponsorship discount factor field 260, and a type of content segment field 265. Sponsorship signature field 255 stores a signature that identifies a level of content sponsorship on the part of the sponsoring entity (e.g., campaign requester 120). Sponsorship discount factor 260 stores data that indicates a factor to be applied to content segments of particular content that has been associated with the sponsorship signature in field 255, where the factor to be applied corresponds to the level of content sponsorship indicated by the sponsorship signature. The sponsorship discount factor 260 may range from 0% to 100%. The type of content segment field 265 stores data that identifies a type of content that is to receive the sponsorship discount factor identified in field 260.

The exemplary table 250 of FIG. 2B depicts four entries 270-1 through 270-4 associated with four different sponsorship signatures and four different sponsorship discount factors. As shown, sponsorship signature field 255 of entry 270-1 stores a sponsorship signature of "A," sponsorship discount factor field 260 stores a discount factor of 100%, and type of content segment field 265 stores data that indicates a high resolution advertisement. Therefore, entry 270-1 of exemplary table 250 is directed to high resolution advertisement content segments that receive a sponsorship discount factor of 100% when the sponsorship signature of "A" is appended/inserted into a manifest file 200 to be used for streaming content that includes the advertisement content segments. A sponsorship discount factor of 100% indicates that all data delivery charges for the advertisement content segment(s) will be toll-free to the mobile user, and 100% of the data will be charged to the sponsor (i.e., campaign requester 120).

As further shown, sponsorship signature field 255 of entry 270-2 stores a sponsorship signature of "B," sponsorship discount factor field 260 stores a discount factor of 100%, and type of content segment field 265 stores data that indicates a low resolution advertisement. Therefore, entry 270-2 of exemplary table 250 is directed to low resolution advertisement content segments that receive a sponsorship discount factor of 100% when the sponsorship signature of "B" is appended/inserted into a manifest file 200 to be used for streaming content that includes the advertisement content segments. A sponsorship discount factor of 100% indicates that all data delivery charges for the advertisement content segment(s) will be toll-free to the user, and 100% of the data will be charged to the sponsor (i.e., campaign requester 120).

As additionally shown, sponsorship signature field 255 of entry 270-3 stores a sponsorship signature of "C," sponsorship discount factor field 260 stores a discount factor of 80%, and type of content segment field 265 stores data that indicates high resolution normal content. Therefore, entry 270-3 of exemplary table 250 is directed to high resolution, normal content segments that receive a sponsorship discount factor of 80% when the sponsorship signature of "C" is appended/inserted into a manifest file 200 to be used for streaming content that includes the high resolution normal content segments. A sponsorship discount factor of 80% indicates that 20% of data delivery charges for the high resolution normal content segment(s) will be charged to the user, and 80% of the data will be charged to the sponsor (i.e., campaign requester 120).

As also shown, sponsorship signature field 255 of entry 270-4 stores a sponsorship signature of "D," sponsorship discount factor field 260 stores a discount factor of 50%, and type of content segment field 265 stores data that indicates low resolution normal content. Therefore, entry 270-4 of exemplary table 250 is directed to low resolution normal content segments that receive a sponsorship discount factor of 50% when the sponsorship signature of "D" is appended/inserted into a manifest file 200 to be used for streaming content that includes the low resolution normal content segments. A sponsorship discount factor of 50% indicates that 50% of data delivery charges for the low resolution normal content segment(s) will be charged to the user, and 80% of the data will be charged to the sponsor (i.e., campaign requester 120).

The number of different sponsorship signatures, the level of sponsorship discount factors, and the type of content segments to which the sponsorship signatures and discount factors apply, are illustrated in FIG. 2B as one example of table 250. Other tables 250, having a different number of sponsorship signatures, and corresponding different sponsorship discount factors and types of content segments, may be alternatively used. For example, a table 250 having eight sponsorship signatures (i.e., A, B, C, D, E, F, G, H), and corresponding sponsorship discount factors, may be used.

Figure 3:
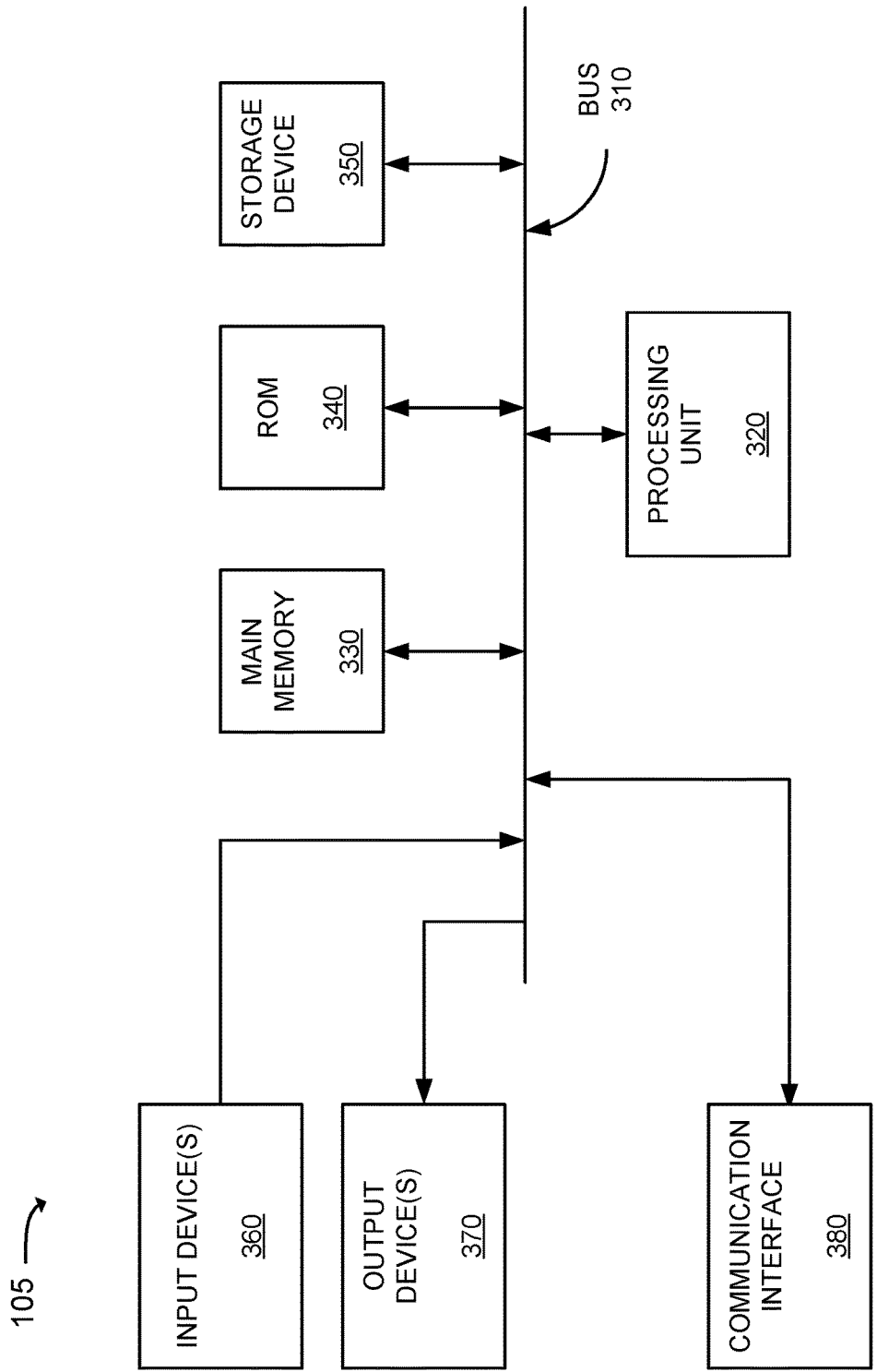
FIG. 3 is a diagram that depicts exemplary components of the campaign portal of FIG. 1A.

FIG. 3 is a diagram that depicts exemplary components of campaign portal 105. Content servers 135, campaign DB 110, charging node 145, devices 115, and mobile devices 125 may each be configured the same as, or similar to, campaign portal 105 shown in FIG. 3. Campaign portal 105 may include a bus 310, a processing unit 320, a main memory 330, a read only memory (ROM) 340, a storage device 350, an input device(s) 360, an output device(s) 370, and a communication interface(s) 380.

Bus 310 may include a path that permits communication among the components of campaign portal 105. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator to input information to campaign portal 105, such as, for example, a keypad or a keyboard, a display with a touch sensitive panel, voice recognition and/or biometric mechanisms, etc. Output device 370 may include one or more mechanisms that output information to the operator or user, including a display, a speaker, etc. Input device 360 and output device 370 may, in some implementations, be implemented as a graphical user interface (GUI) that displays GUI information and which receives user input via the GUI. Communication interface(s) 380 may include a transceiver that enables campaign portal 105 to communicate with other devices and/or systems. For example, communication interface(s) 380 may include wired and/or wireless transceivers for communicating via network(s) 140.

The configuration of components of campaign portal 105 shown in FIG. 3 is for illustrative purposes. Other configurations may be implemented. Therefore, campaign portal 105 may include additional, fewer and/or different components, arranged in a different configuration, than depicted in FIG. 3.

Figure 4:
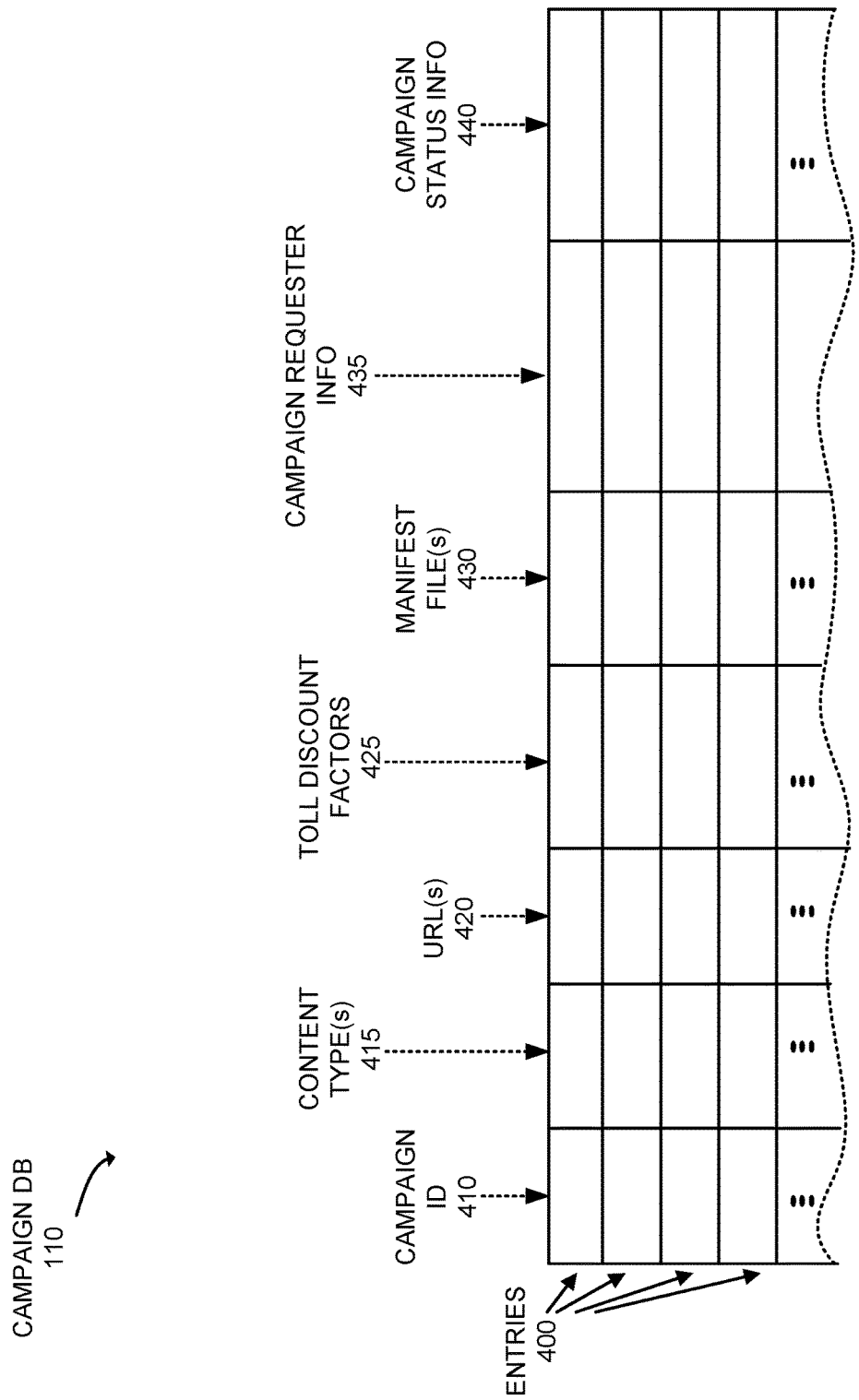
FIG. 4 is a diagram that depicts an exemplary implementation of a data structure stored in the campaign database of FIG. 1A.

FIG. 4 is a diagram that depicts an exemplary implementation of a data structure stored in campaign DB 110. As shown, the data structure of campaign DB 110 may include multiple entries 400, with each entry 400 including a campaign ID field 410, a content type(s) field 415, a URL(s) field 420, a toll discount factors field 425, a manifest file(s) field 430, a campaign requester information field 435, and a campaign status information field 440. Each entry 400 may be indexed with, for example, a particular campaign ID value or URL to locate an entry 400 having a matching campaign ID value stored in campaign ID field 410, or URL stored in URL(s) field 420. When such an entry 400 is located, data may be stored in one or more of fields 410-440 of the entry 400, or data may be retrieved from one or more of fields 410-440 of the entry 400. Other fields of an entry 400, instead of campaign ID field 410 or URL(s) field 420 may be used for indexing campaign DB 110.

Campaign ID field 410 stores a unique campaign ID associated with a particular toll-free/reduced toll data campaign requested by a campaign requester 120. The campaign ID may be used by campaign portal 105 or media player 150 for identifying particular toll discount factors associated with a given campaign. Content type(s) field 415 identifies one or more content types that are being sponsored as part of the campaign identified by campaign ID field 410. URL(s) field 420 stores the URL, or a group of URLs, associated with the location(s) of a manifest file(s) associated with particular ABS streaming content whose access by mobile users 130 is to be toll-free or reduced toll.

Toll discount factors field 425 stores the multiple different toll discount factors associated with the campaign identified in campaign ID field 410 of entry 400. The multiple discount factors may be specified by the content sponsor (i.e., campaign requester 120), or may be specified by campaign portal 105. Manifest file(s) field 430 stores one or more manifest files that include, among other data, various types of data describing the network location(s) of the content segments for the sponsored ABS streaming content. Field 430 may store the manifest file(s) itself/themselves, or it may store a pointer (i.e., a reference to a location in memory) where the manifest file(s) is stored, and from where it can be retrieved.

Campaign requester information field 435 stores information associated with the campaign requester 120 that has requested a toll-free or reduced toll campaign for particular content. The information stored in field 435 may include, for example, the identity, physical address, electronic address (e.g., email address), and/or payment information of the campaign requester 120. Campaign status information field 440 stores information associated with the current status of the campaign identified by campaign ID field 410 of entry 400. For example, field 440 may store information that indicates a budget for the toll-free or reduced toll campaign such as, for example, a data transfer maximum in Megabytes (MB) or Gigabytes (GB), or a data transfer cost maximum in dollars, and the current status of the toll-free or reduced toll campaign relative to the budget (e.g., out of budget, low on budget). The campaign status information field 440 may store additional status information indicating, for example, that the campaign is temporarily paused or suspended, the campaign is discontinued, a resumption day and/or time at which a campaign is resumed, a day and/or time at which a campaign begins, etc.

Campaign DB 110 is depicted in FIG. 4 as including a tabular data structure with a certain number of fields having certain content. The tabular data structure of campaign DB 110 shown in FIG. 4, however, is for illustrative purposes. Other types of data structures may alternatively be used. The number, types, and content of the entries and/or fields in the data structure of campaign DB 110 illustrated in FIG. 4 is also for illustrative purposes. Other data structures having different numbers of, types of and/or content of, the entries and/or the fields may be implemented. Therefore, campaign DB 110 may include additional, fewer and/or different entries and/or fields than those depicted in FIG. 4.

Figure 5:
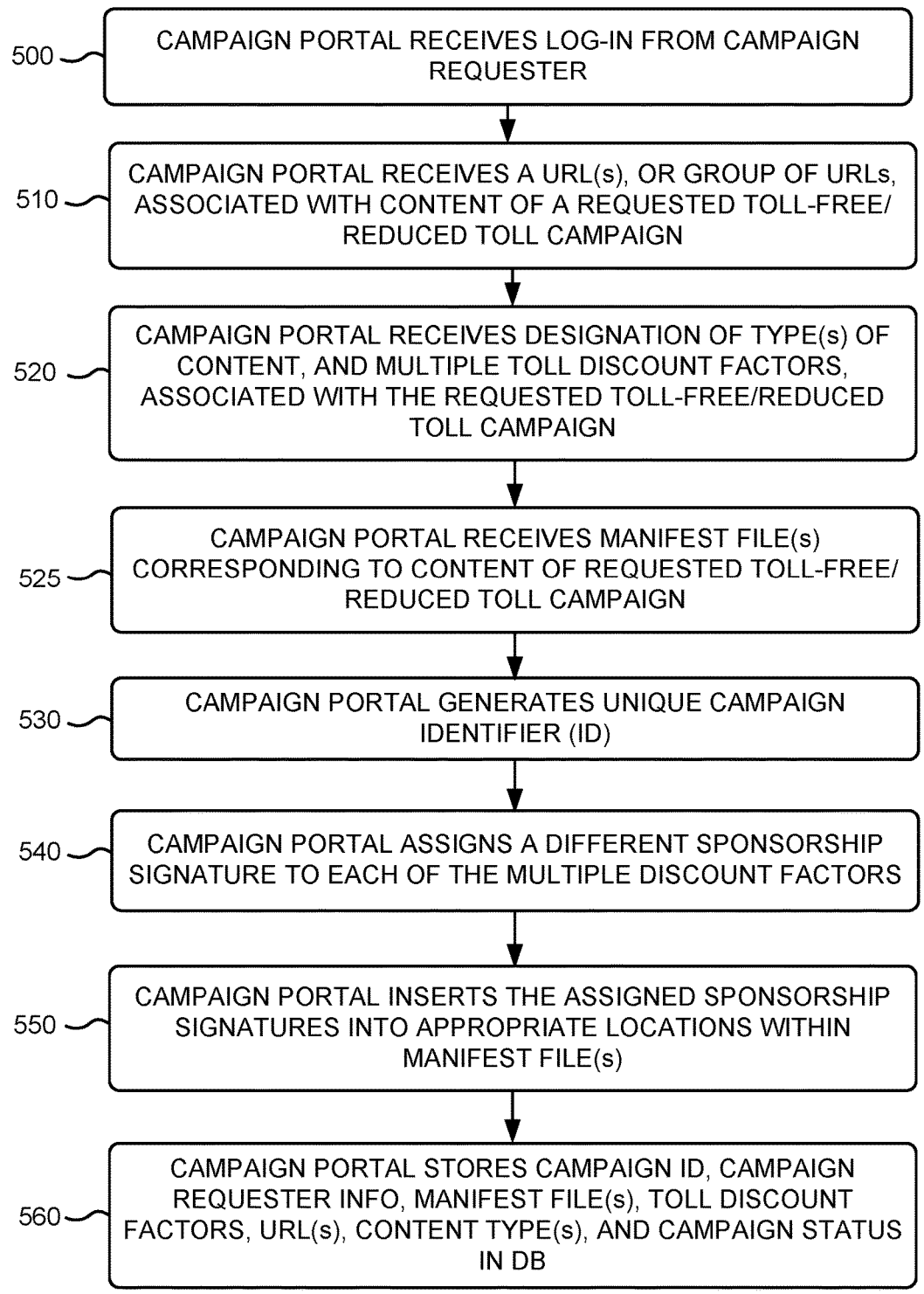
FIG. 5 is a flow diagram that illustrates an exemplary process for establishing a toll-free or reduced toll campaign for mobile user access to particular content.
Figure 6:
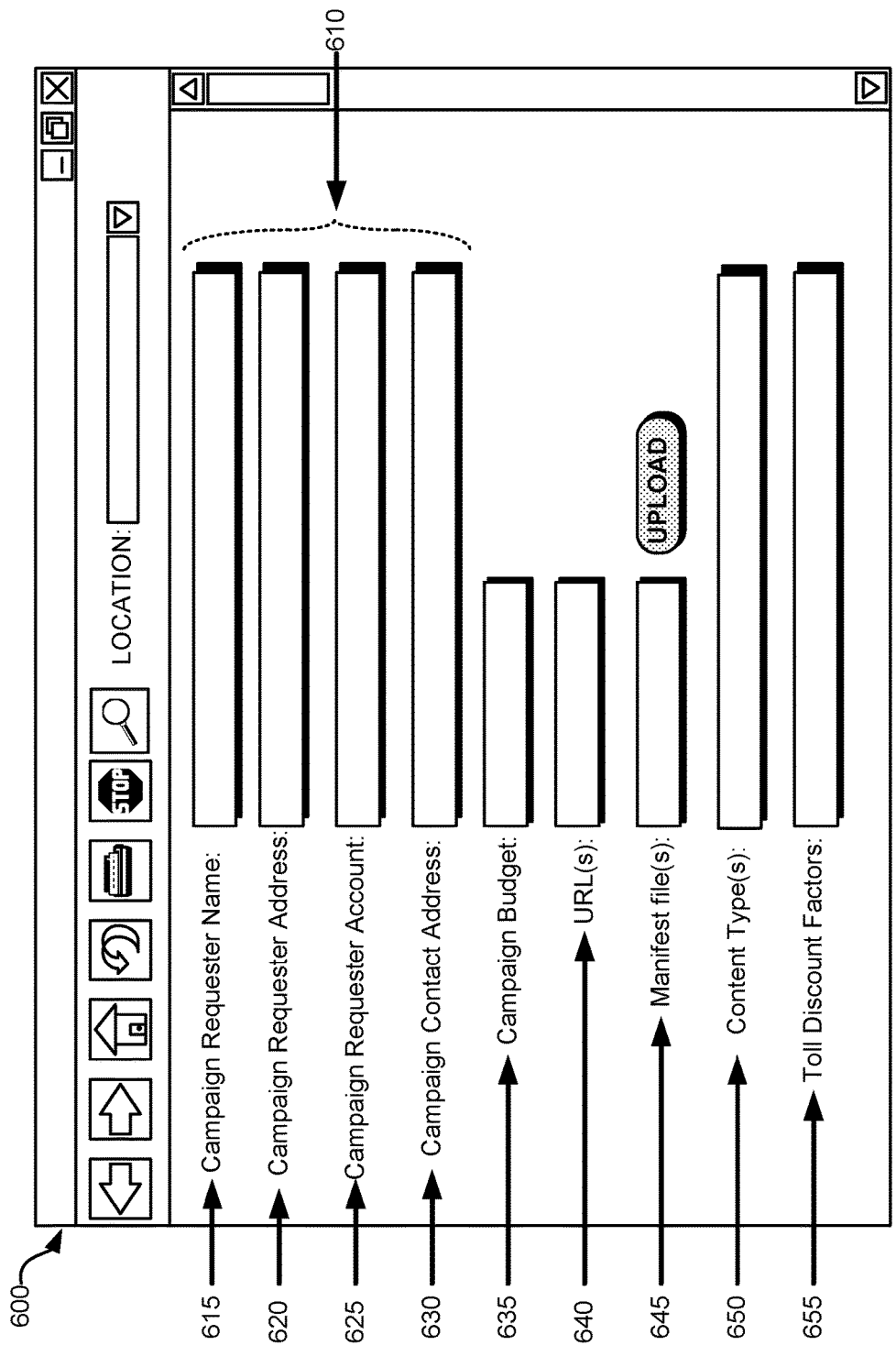
FIG. 6 depicts an exemplary user interface used by a campaign requester of FIG. 1A for establishing a toll-free or reduced toll campaign.

FIG. 5 is a flow diagram that illustrates an exemplary process for establishing a toll-free or reduced toll campaign for mobile user access to particular content (e.g., access without incurring a network data delivery charge, or with incurring a reduced network data delivery charge). The exemplary process of FIG. 5 may be implemented by campaign portal 105. The exemplary process of FIG. 5 is described below with reference to the diagrams of FIGS. 6 and 7.

Figure 7:
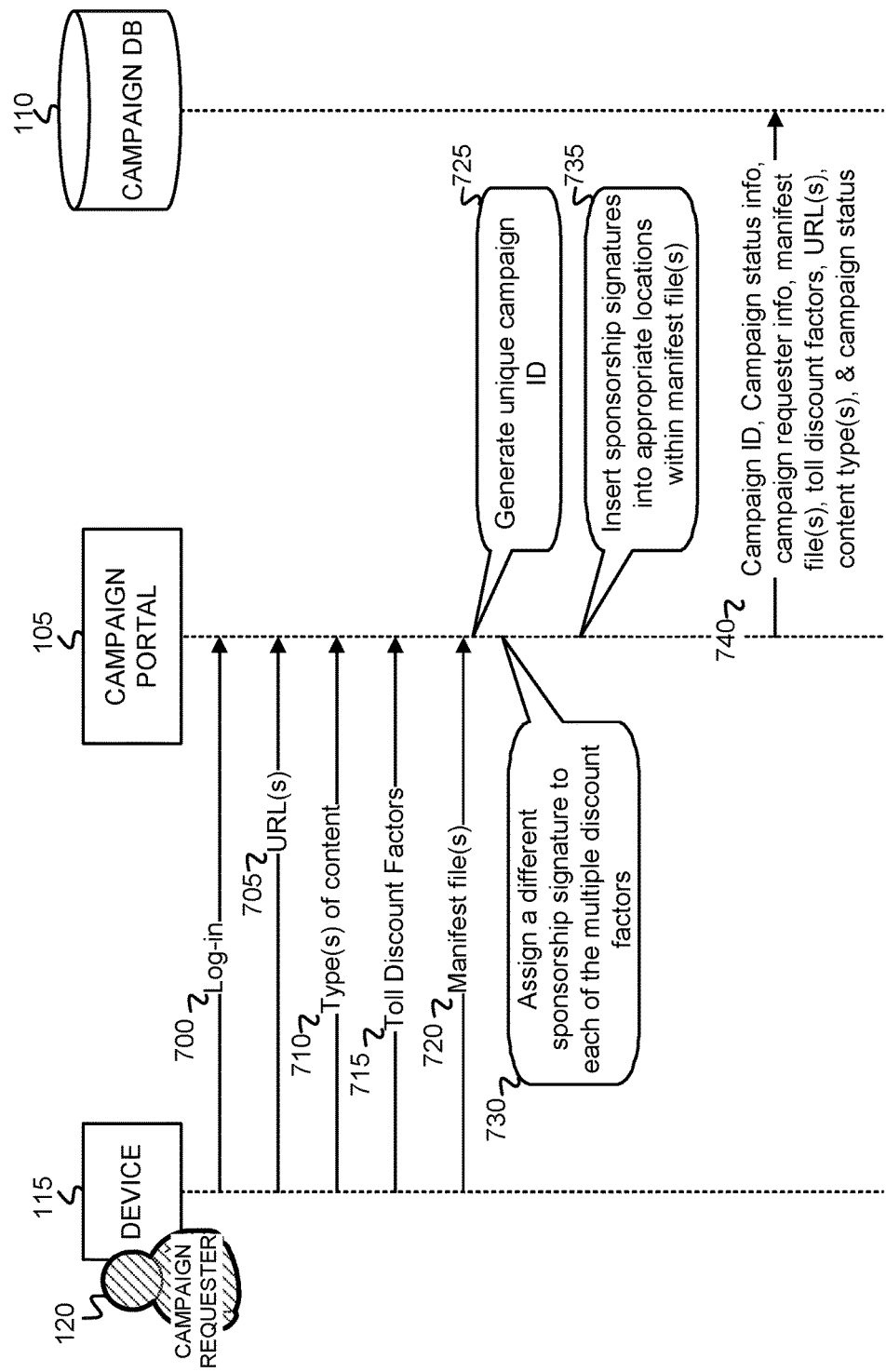
FIG. 7 is an exemplary messaging diagram associated with the exemplary process of FIG. 5.

The exemplary process may include campaign portal 105 receiving a log-in from a campaign requester 120 (block 500). The campaign requester 120 may have previously established an account with campaign portal 105, including selecting a username and password log-in. Campaign requester 120 may, via device 115, send log-in information to campaign portal 105 via network(s) 140. Upon verification of the log-in, campaign portal 105 permits campaign requester 120 to provide, or update, campaign requester information 435, including, for example, entering, via user interface 600 depicted in FIG. 6, an entity name in campaign requester name field 615, a physical address in campaign requester address field 620, account information in campaign requester account field 625, and a contact address (e.g., email address and/or phone number) in campaign contact address field 630. Subsequent to verification of the log-in, campaign portal 105 further permits campaign requester 120 to provide the URL, or a group of URLs, to be associated with a particular toll-free or reduced toll campaign, where the URL, or group of URLs, identifies a network location(s) of one or more manifest files associated with the content of the campaign. The messaging diagram of FIG. 7 depicts campaign requester 120 providing, via device 115, a log-in 700 to campaign portal 105.

Campaign portal 105 receives the URL, or the group of URLs, that identifies a network location(s) of the one or more manifest files associated with the content of the requested toll-free or reduced toll campaign (block 510). Referring to the exemplary user interface 600 of FIG. 6, campaign requester 120 may enter a particular URL, or a group of URLs, in URL(s) field 640, where campaign requester 120 is requesting that content associated with the manifest file(s) stored at the particular URL, or group of URLs, be toll-free or reduced toll when accessed by a mobile user 130 via, for example, a PLMN of network(s) 140. In addition to the URL, or group of URLs, campaign requester 120 may supply a campaign budget via a campaign budget field 635 of user interface 600. The campaign budget may include information related to a maximum budget for the toll-free campaign such as, for example, a data transfer maximum in MB or GB, or a maximum data transfer cost in dollars. The campaign budget, therefore, may set a global budget limit on data transfer for the particular toll-free campaign. Once the global budget limit is reached via content accessed by one or more mobile users 130, the campaign will be designated as "out of budget" and no longer valid for subsequent content access requests. In such a case, subsequent content access requests, and the corresponding data delivery, will be charged normal network usage charges (e.g., in MB) to the mobile user 130's account. The messaging diagram of FIG. 7 depicts campaign requester 120 providing, via device 115, a URL, or a group of URLs 605 to campaign portal 105.

Campaign portal 105 receives a designation of a type(s) of content, and multiple toll discount factors, associated with the requested toll-free or reduced toll campaign (block 520). Referring to the exemplary user interface 600 of FIG. 6, campaign requester 120 may enter data identifying one or more content types, in content type(s) field 650, of the content of the toll-free or reduced toll campaign. The type(s) of content may include, for example, advertisement content, or normal video content. Campaign requester 120 may additionally enter the multiple toll discount factors, in toll discount factors field 655 of user interface 600, of the content of the toll-free or reduced toll campaign. Each of the toll discount factors identifies a level of discount to be applied to the content based on, for example, a type of the content, a bitrate and/or resolution of the delivered content. The messaging diagram of FIG. 7 depicts campaign requester 120 providing, via device 115, the type(s) 710 of the content of the toll-free or reduced toll campaign, and the toll discount factors 715.

Campaign portal 105 receives a manifest file(s) 200 corresponding to the content of the requested toll-free or reduced toll campaign (block 525). The manifest file(s) 200, as described above with respect to FIG. 2A, includes, among other data, network location data for each of the content segments of the ABS streaming content. Referring to the exemplary user interface 600 of FIG. 6, campaign requester 120 may upload, via manifest file(s) field 645, the one or more manifest files for the content. The messaging diagram of FIG. 7 further depicts campaign requester 120 providing, via device 115, the manifest file(s) 720 corresponding to the content of the toll-free or reduced toll campaign.

Campaign portal 105 generates a unique campaign identifier (ID) (block 530). Any type of numbering or labeling scheme may be used for generating a campaign ID, as long as each generated campaign ID is globally unique among all other campaign IDs. The unique campaign identifier may, for example, include a unique alphanumeric identifier. FIG. 7 shows campaign portal 105 generating 725 a unique campaign ID for the toll-free or reduced toll campaign requested by the campaign requester 120. Campaign portal 105 assigns a different sponsorship signature to each of the multiple discount factors of the toll-free or reduced toll campaign (block 540). FIG. 7 depicts campaign portal 105 assigning 730 a different sponsorship signature to each of the multiple discount factors provided by the campaign requester 120 in block 520. In an example in which four discount factors are designated by the campaign requester 120, campaign portal 105 may assign signature "A" to the first discount factor, signature "B" to the second discount factor, signature "C" to the third discount factor, and signature "D" to the fourth discount factor.

Campaign portal 105 inserts the assigned sponsorship signatures into appropriate locations within the manifest file(s) (block 550). Referring back to manifest file 200 in FIG. 2A, an appropriate sponsorship signature is appended to each content segment network location (seg_network_location) specified in manifest field 200. FIG. 7 depicts campaign portal 105 inserting 735 the sponsorship signatures into appropriate locations within the manifest file(s) provided by the campaign requester 120 in block 525.

Campaign portal 105 stores the campaign ID, campaign requester information, manifest file(s), toll discount factors, URL(s), content type(s), and campaign status information in campaign DB 110 (block 560). Campaign portal 105 may store the campaign ID in campaign ID field 410, the campaign requester information in campaign requester info field 435, the manifest file(s) in manifest file(s) field 430, the toll discount factors in toll discount factors field 425, the URL(s) in URL(s) field 420, the content type(s) in content type(s) field 415, and the campaign status information in campaign status info field 440. FIG. 7 depicts campaign portal 105 storing 740 the campaign ID, the campaign requester information, the manifest file(s), the toll discount factors, the URL(s), the content type(s), and the campaign status information in campaign DB 110. Additionally, campaign portal 105 may generate, for the campaign requester 120, a sponsorship signature table 250 that maps the different sponsorship signatures to discount factors, and to types/resolutions of ABS content segments.

The blocks of FIG. 5 may be selectively repeated each time a campaign requester 120 seeks to create a new toll-free or reduced toll campaign. Additionally, each block of FIG. 5 may be individually repeated each time a campaign requester 120 seeks to update a specific aspect of an existing toll-free or reduced toll campaign (e.g., update campaign status information).

Figure 8A:
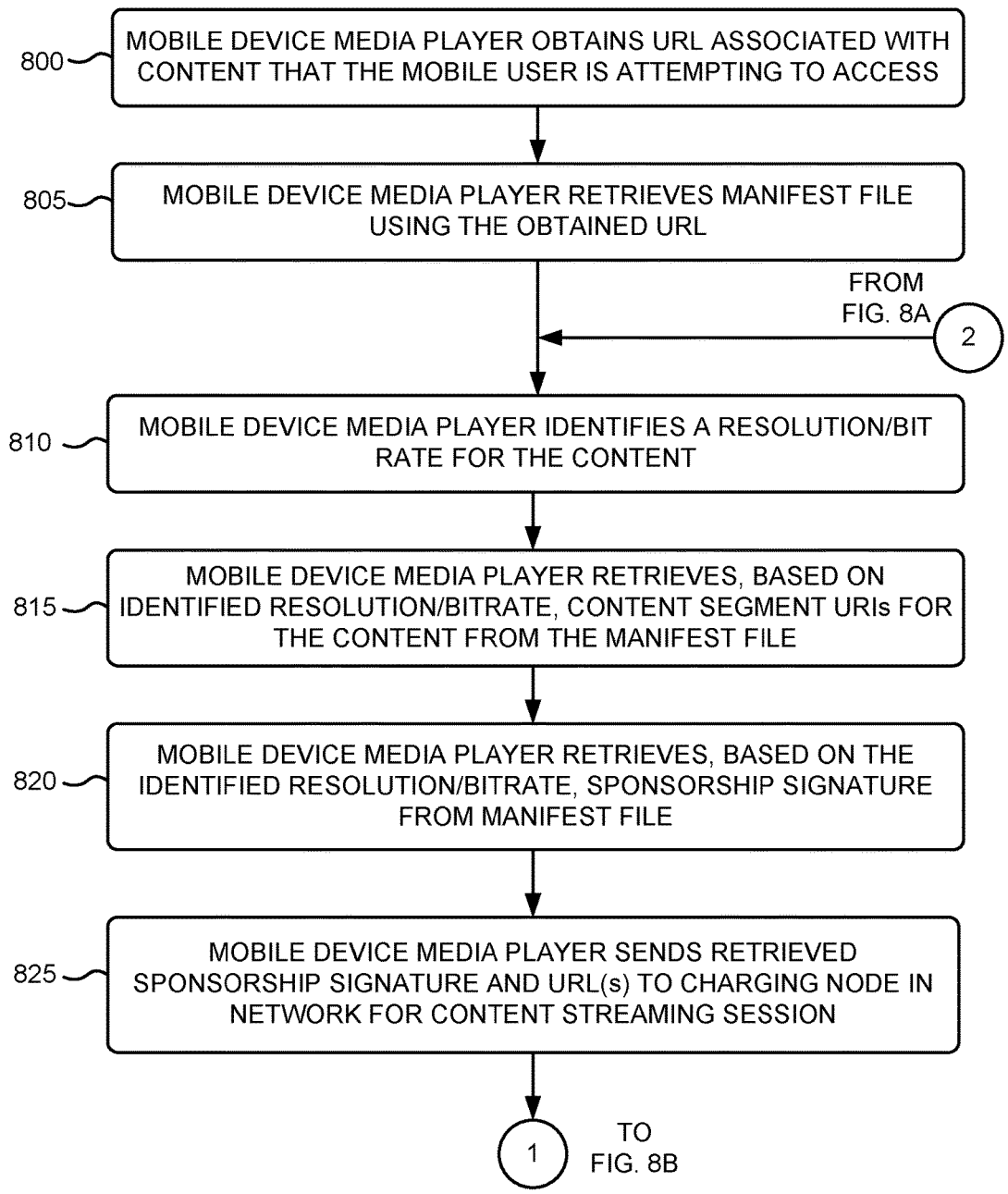
FIGS. 8A and 8B are flow diagrams that illustrate an exemplary process for retrieving a sponsorship signature(s) from a manifest file for ABS streaming content, providing the sponsorship signature(s) to a charging node, and engaging in a content streaming session with network delivery charges being applied based on the provided sponsorship signature(s)
Figure 8B:
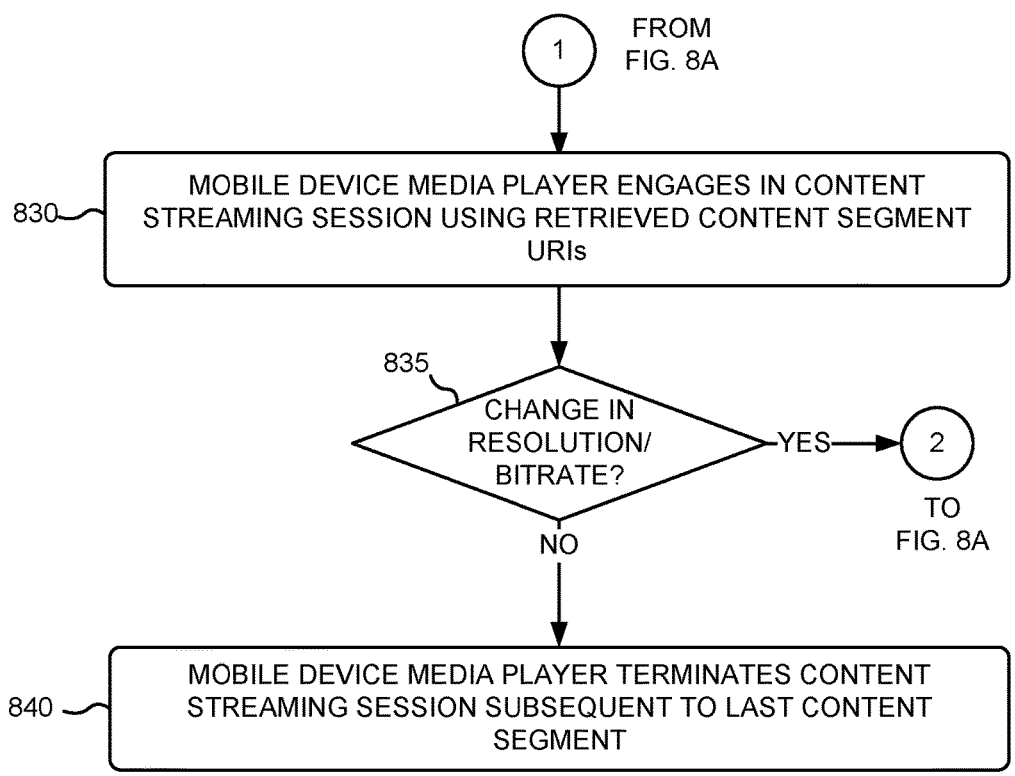

FIGS. 8A and 8B are flow diagrams that illustrate an exemplary process for retrieving a sponsorship signature(s) from a manifest file 200 for ABS streaming content, providing the sponsorship signature(s) to charging node 145, and engaging in a content streaming session with network delivery charges being applied based on the provided sponsorship signature(s). The exemplary process of FIGS. 8A and 8B may be implemented by media player 150 at mobile device 125, in conjunction with charging node 145. The exemplary process of FIGS. 8A and 8B is described below with reference to the exemplary messaging diagram of FIG. 9.

Figure 9:
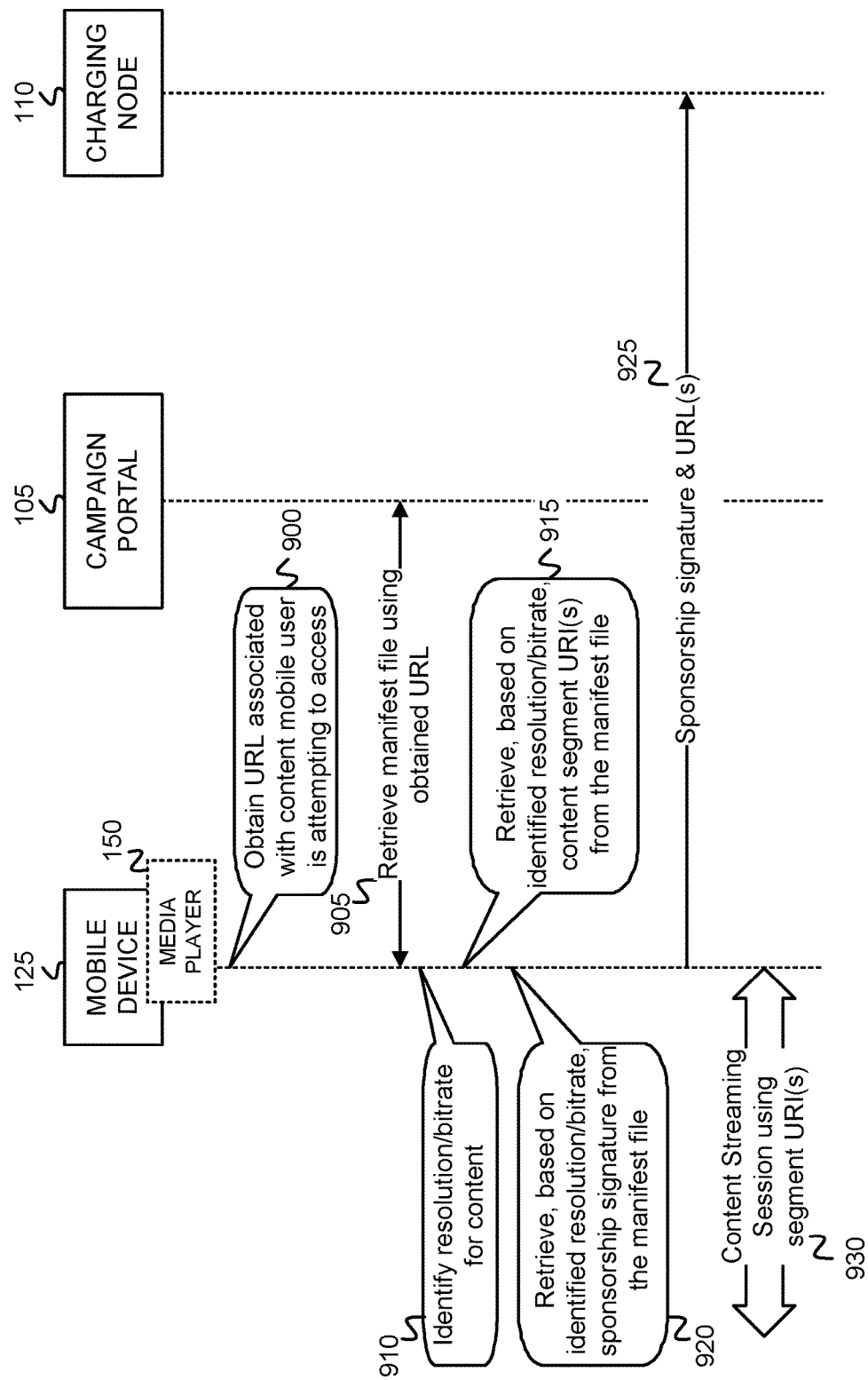
FIG. 9 is an exemplary messaging diagram associated with the exemplary process of FIGS. 8A and 8B.

The exemplary process includes media player 150 of a mobile device 125 obtaining a URL associated with content that the mobile user is attempting to access (block 800). When the mobile user 130 attempts to access content hosted by a content server 135, media player 150 obtains a URL of a manifest file 200 associated with the requested content. FIG. 9 depicts media player 150 obtaining the URL associated with the requested content. Media player 150 of mobile device 125 retrieves the manifest file(s) for the content using the obtained URL (block 805). Media player 150 retrieves the manifest file 200, either from content server 135, or from campaign portal 105, using the obtained URL. FIG. 9 depicts media player 150 retrieving 905 the manifest file from campaign portal 105.

Media player 150 of mobile device 125 identifies a resolution/bitrate for the ABS streaming content (block 810). Media player 150 may select a resolution for the content based on the resolution of the display (e.g., size and resolution of the display screen) of mobile device 125 and/or based an available bandwidth of the connection between mobile device 125 and PLMN 160. FIG. 9 depicts media player 150 identifying 910 a resolution/bitrate for the registered content.

Media player 150 of mobile device 125 retrieves, based on the identified resolution/bitrate, content segment URIs for the content from the manifest file (block 815). Media player 150 matches the identified resolution with a corresponding resolution bitrate 225 or 230 in the manifest file 200, and retrieves the content segment URIs (seg_network_location) from the manifest file 200. FIG. 9 depicts media player 150 retrieving 915, based on the identified resolution/bitrate, the content segment URIs from the manifest file.

Media player 150 of mobile device 125 retrieves, based on the identified bitrate, a sponsorship signature from the manifest file (block 820). Referring to FIG. 2B, media player 150 retrieves, appended to each of the content segment URIs, a sponsorship signature(s) 240 from the manifest file 200. FIG. 9 depicts media player 150 retrieving, based on the identified resolution/bitrate, a sponsorship signature from the manifest file. Media player 150 of mobile device 125 sends the retrieved sponsorship signature and URL(s) to charging node 145 in network 140 for a content streaming session (block 825). The URL, obtained in block 800, and the sponsorship signature obtained in block 820, are inserted into a message 925 and, as depicted in FIG. 9, sent to charging node 145. Charging node 145 handles the charging of data usage to the mobile user 130 and/or to the sponsor of a particular toll-free or reduced toll campaign as described below with respect to FIGS. 10 and 11. Media player 150 of mobile device 125 engages in the content streaming session using the retrieved content segment URIs (block 830). To engage in the content streaming session, media player 150 uses the content segment URIs obtained in block 815 to retrieve the content segments stored at content server 135. FIG. 9 depicts media player 150 engaging in a content streaming session 930 using the content segment URIs.

Media player 150 determines if there is a change in resolution/bitrate (block 835). A change in resolution or bitrate may be necessitated by, for example, traffic conditions affecting the connection between the mobile device 125 and PLMN 160. For example, high levels of traffic may necessitate media player 150 switching from higher resolution content (e.g., 1080p video) to lower resolution content (e.g., 720p video) to prevent interruptions in playback of the streaming content. If there is a change in resolution and/or bitrate (YES—block 835), then the exemplary process returns to block 810, with media player 150 retrieving content segment URIs, from manifest file 200, that correspond to the new identified resolution/bitrate.

Media player 150 of mobile device 125 terminates the content streaming session subsequent to the last content segment (block 840). When a final content segment is played back, media player 150 terminates the ABS content streaming session. The exemplary process of FIGS. 8A and 8B may be repeated for each request of content by a mobile user 130 at a mobile device 125.

Figure 10:
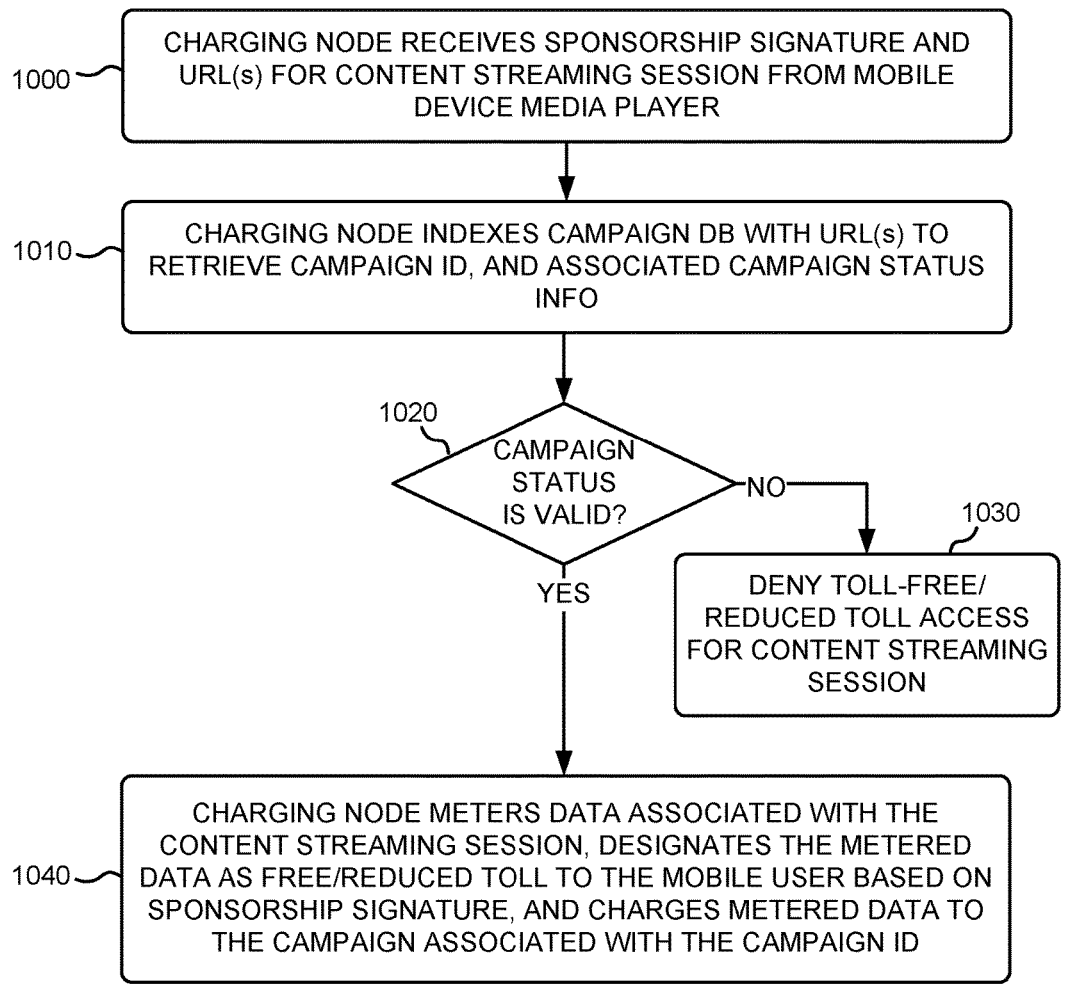
FIG. 10 is a flow diagram that illustrates an exemplary process for receipt, at a charging node, of a sponsorship signature retrieved from a manifest file for particular content, and determining whether to designate content streamed via PLMN(s) as toll-free or reduced toll to the requesting mobile user.

FIG. 10 is a flow diagram that illustrates an exemplary process for receipt, at charging node 145, of a sponsorship signature retrieved from a manifest file 200 for particular content, and determining whether to designate content streamed via PLMN(s) 160 as toll-free, or reduced toll, to the requesting mobile user 130. The exemplary process of FIG. 10 may be implemented by charging node 145. The exemplary process of FIG. 10 is described below with reference to the diagram of FIG. 11.

Figure 11:
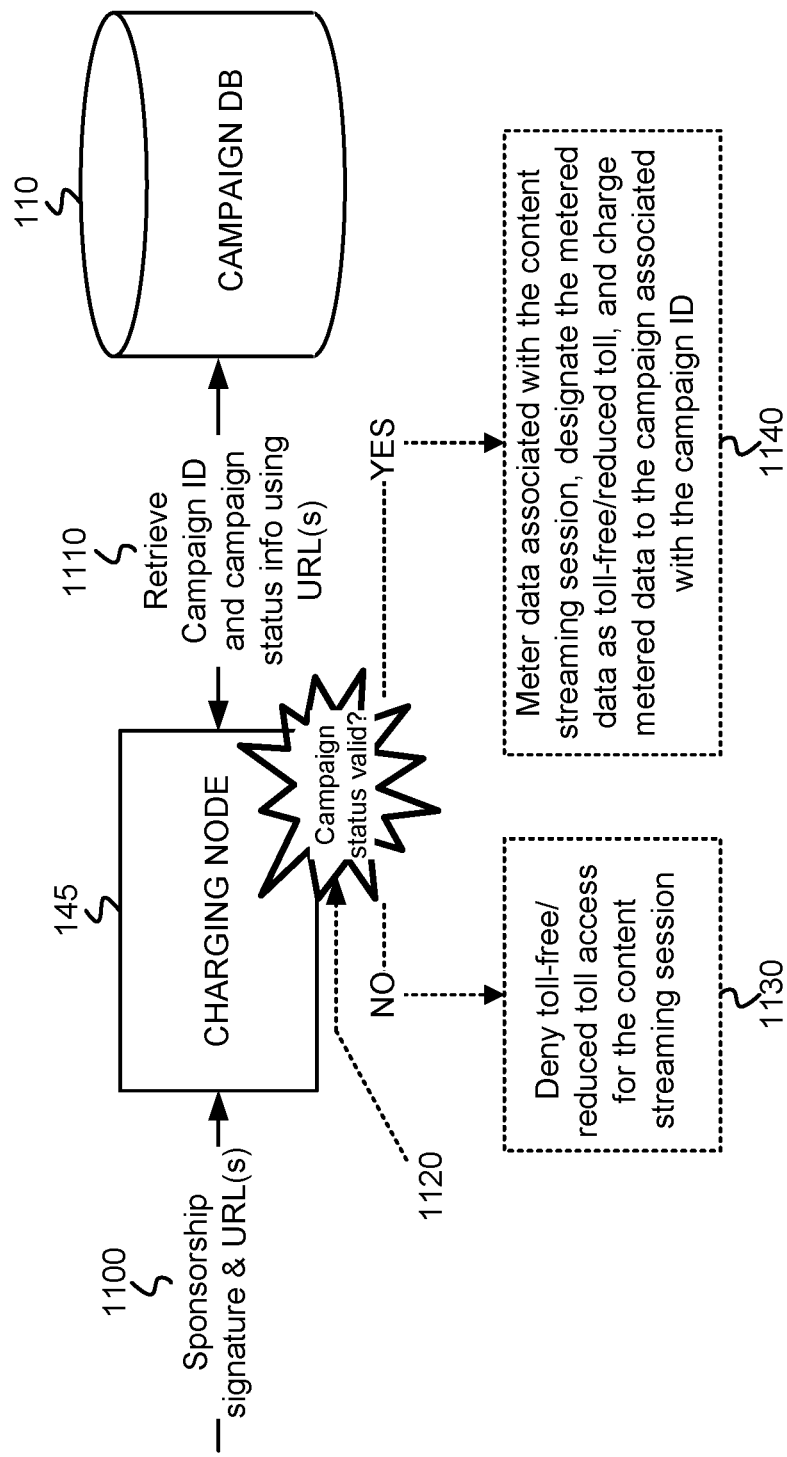
FIG. 11 is a diagram that graphically depicts the exemplary process of FIG. 10.

The exemplary process includes charging node 145 receiving a sponsorship signature and URL(s) for a content streaming session from a media player 150 at mobile device 125 (block 1000). As shown in FIG. 11, charging node 145 receives a message 1100 (i.e., sent in block 825 of FIG. 8A) that identifies a sponsorship signature and URL(s) associated with a content streaming session. Charging node 145 indexes campaign DB 110 with the URL(s) to retrieve a campaign ID, and associated campaign status information (block 1010). The retrieved campaign status information may indicate, for example, whether the campaign is still valid (e.g., has remaining data in its campaign budget). FIG. 11 depicts charging node 145 retrieving 1110 the campaign ID and campaign status information from campaign DB 110.

Charging node 145 determines, based on the retrieved campaign status information, if the campaign status is currently valid (block 1020). The campaign status information may indicate, for example, that the campaign is currently within its budget constraints (i.e., the campaign is currently valid), may indicate that the campaign is currently out of budget (i.e., the campaign is currently invalid), or may indicate that the campaign is currently paused or suspended (i.e., temporarily invalid). The validity of the campaign may also be dependent upon a time associated with the content request or based current network traffic conditions. For example, a given campaign may be valid or invalid during certain time periods, or may be valid or invalid as a function of the current network traffic conditions (e.g., congested network traffic conditions means the campaign is temporarily invalid or suspended). FIG. 11 depicts charging node 145 determining 1120 if the campaign status is currently valid.

If the campaign is not currently valid (NO—block 1020), then charging node 145 denies (1130, FIG. 11) toll-free or reduced toll access for the content streaming session (block 1030). Although mobile device 125 will still be able to access the content during the content streaming session, mobile user 130 will be, however, charged normal data delivery or transfer charges by charging node 145. Thus, denial of the toll-free/reduced toll access means that charging node 145 charges the mobile user 130 for all of the data that is delivered to mobile device 125 during the content streaming session. If the campaign is currently valid (YES—block 1020), then charging node 145 meters (1140, FIG. 11) data associated with the content streaming session, designates the metered data as free or reduced toll to the mobile user based on the received sponsorship signature, and charges the metered data to the campaign associated with the campaign ID (block 1040).

The data associated with the streaming content delivered to mobile device 125 via PLMN 160 may be metered by charging node 145, and designated as being toll-free or reduced toll based on the sponsorship signature(s). Metered data designated as being toll-free, or the reduced toll portion of the metered data, is identified by charging node 145 as being free to mobile user 130 (i.e., mobile user 130's mobile account in PLMN is not charged for the data delivery), and the particular campaign's budget is charged with the entire data delivery, or with a portion of the data delivery. Therefore, for each amount of data designated as being toll-free, or reduced toll, by charging node 145, the budget of the corresponding campaign is reduced by the amount of that data. For example, if a particular campaign has a budget of 100 GB, and 5 MB of sponsored content is accessed by the mobile user 130, then the 5 MB (and possibly additional data associated with the content request) may be subtracted from the 100 GB budget to leave a remaining budget of data still available for the particular campaign. Charging node 145 may use sponsorship signature table 250 to map the sponsorship signature received in block 1000 to a sponsorship discount factor. For example, referring to the example of FIG. 2B, if a sponsorship signature of "C" is received, charging node 145 may identify signature "C" in field 255 of entry 270-3, and retrieve the sponsorship discount factor of 80% from field 260 of entry 270-3. In this example, 20% of the data delivered during the content streaming session is charged to the mobile user 130 and 80% of the delivered data is charged to the sponsor (e.g., campaign requester 120).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 8A, 8B, and 10, and message/activity flows with respect to FIGS. 7 and 11, the order of the blocks and/or message flows may be varied in other implementations. Moreover, non-dependent blocks may be performed in parallel. Embodiments have been described herein involving a campaign requester 120 uploading a pre-generated manifest file to campaign portal 105 for insertion/appending of sponsorship signatures into appropriate locations within the manifest file. In other embodiments, such as when the sponsored content includes live content, the manifest file(s) may be generated "on the fly," during the occurrence of the live content, and the appropriate sponsorship signature(s) is inserted/appended to appropriate locations within the generated manifest file(s). The manifest file(s) may then be provided to a content server 135 and/or to campaign portal 105 for access by a mobile device 125.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    retrieving, by a media playing device and from a campaign portal that stores information regarding toll-free or reduced toll data campaigns for content hosted by content servers, a manifest file associated with streaming content, wherein the manifest file includes a first sequence of multiple first Uniform Resource Identifiers (URIs) that identify first network storage locations of multiple first content segments of the streaming content that correspond to a first bitrate, and wherein a first sponsorship signature of multiple sponsorship signatures is appended to at least one of the multiple first URIs of the manifest file;
    retrieving, by the media playing device and from the campaign portal, the multiple first URIs, and the first sponsorship signature, from the manifest file;
    sending, by the media playing device, the first sponsorship signature to a charging node in a Public Land Mobile Network (PLMN) for controlling the charging of data delivery associated with the streaming content to one of a user of the media playing device or a sponsor of the streaming content based on the first sponsorship signature, wherein the charging node determines whether a campaign associated with the first sponsorship signature is currently valid;
    determining whether a bitrate associated with the media playing device has changed from the first bitrate to a second bitrate;
    when the bitrate associated with the media playing device has changed from the first bitrate to the second bitrate:
        retrieving, by the media playing device and from the campaign portal, a second sequence of multiple second URIs that identify second network storage locations of multiple second content segments of the streaming content that correspond to the second bitrate; and
    engaging, via the PLMN by the media playing device using the multiple first URIs, in a content streaming session to receive the streaming content when the bitrate associated with the media playing device has not changed from the first bitrate to the second bitrate.

2. The method of claim 1, wherein the manifest file is associated with adaptive bitrate streaming (ABS) content and wherein the content streaming session comprises an ABS streaming session.

3. The method of claim 1, wherein each of the multiple sponsorship signatures is associated with a different one of multiple sponsorship discount factors.

4. The method of claim 3, further comprising:
    determining a first sponsorship discount factor, of the multiple sponsorship discount factors, that corresponds to the first sponsorship signature, and
    wherein controlling the charging of data delivery associated with the streaming content to the one of the user of the media playing device or the sponsor of the streaming content is further based on the first sponsorship discount factor.

5. The method of claim 4, wherein controlling the charging of data delivery further comprises:
allocating a first portion of the data delivery associated with the streaming content to the user of the media playing device in accordance with the first sponsorship discount factor; and
allocating a second portion of the data associated with the streaming content to the sponsor of the streaming content in accordance with the first sponsorship discount factor.

6. The method of claim 2, wherein the first bitrate is associated with the ABS streaming session.

7. The method of claim 6, wherein a second sponsorship signature of the multiple sponsorship signatures is appended to at least one of the multiple second URIs of the manifest file;
wherein retrieving, by the media playing device, the second sequence of multiple second URIs comprises retrieving the second sponsorship signature from the manifest file; and
wherein the method further comprises:
sending, by the media playing device, the second sponsorship signature to the charging node in the PLMN for controlling the charging of data delivery associated with the ABS content to one of the user of the media playing device or the sponsor of the ABS content based on the second sponsorship signature; and
engaging, via the PLMN by the media playing device using the multiple second URIs, in an ABS streaming session to receive the ABS content.

8. The method of claim 7, further comprising:
identifying, subsequent to engaging in the ABS streaming session using the multiple first URIs, the second bitrate for the ABS streaming session,
wherein retrieving the second sequence of multiple second URIs and the second sponsorship signature from the manifest file is based on the identified second bitrate.

9. A device, comprising:
a communication interface configured to connect to a Public Land Mobile Network (PLMN), and to receive, via the PLMN, a manifest file associated with streaming content from a campaign portal that stores information regarding toll-free or reduced toll data campaigns for the streaming content, wherein the manifest file includes a first sequence of multiple first Uniform Resource Identifiers (URIs) that identify first network storage locations of multiple first content segments of the streaming content that correspond to a first bitrate, and wherein a first sponsorship signature of multiple sponsorship signatures is appended to at least one of the multiple first URIs of the manifest file; and
a processing unit configured to:
retrieve the multiple first URIs, and the first sponsorship signature, from the manifest file;
send, via the communication interface, the first sponsorship signature to a charging node in the PLMN for controlling the charging of data delivery associated with the streaming content to one of a user of the device or a sponsor of the streaming content based on the first sponsorship signature, wherein the charging node determines whether a campaign associated with the first sponsorship signature is currently valid,
determine whether a bitrate associated with the device has changed from the first bitrate to a second bitrate,
when the bitrate associated with the device has changed from the first bitrate to the second bitrate:
retrieve, from the campaign portal, a second sequence of multiple second URIs that identify second network storage locations of multiple second content segments of the streaming content that correspond to the second bitrate, and
engage, via the PLMN using the multiple first URIs, in a content streaming session to receive the streaming content when the bitrate associated with the device has not changed from the first bitrate to the second bitrate.

10. The device of claim 9, wherein the manifest file is associated with adaptive bitrate streaming (ABS) content and wherein the content streaming session comprises an ABS streaming session.

11. The device of claim 9, wherein each of the multiple sponsorship signatures is associated with a different one of multiple sponsorship discount factors.

12. The device of claim 11, wherein the processing unit is further configured to:
determine a first sponsorship discount factor, of the multiple sponsorship discount factors, that corresponds to the first sponsorship signature, and
wherein the controlling of the charging of data delivery associated with the streaming content to the one of the user of the device or the sponsor of the streaming content is further based on the first sponsorship discount factor.

13. The device of claim 12, wherein, when controlling the charging of data delivery further, the processing unit is further configured to:
allocate a first portion of the data delivery associated with the streaming content to the user of the device in accordance with the first sponsorship discount factor, and
allocate a second portion of the data associated with the streaming content to the sponsor of the streaming content in accordance with the first sponsorship discount factor.

14. The device of claim 10, wherein the first bitrate is associated with the ABS streaming session.

15. The device of claim 14, wherein a second sponsorship signature of the multiple sponsorship signatures is appended to at least one of the multiple second URIs of the manifest file, and
wherein, when retrieving the second sequence of multiple URIs, the processing unit is further configured to retrieve the second sponsorship signature from the manifest file, and
wherein the processing unit is further configured to:
send, via the communication interface, the second sponsorship signature to the charging node in the PLMN for controlling the charging of data delivery associated with the ABS content to one of the user of the device or the sponsor of the ABS content based on the second sponsorship signature, and
engage, via the PLMN using the multiple second URIs, in an ABS streaming session to receive the ABS content.

16. The device of claim 15, wherein the processing unit is further configured to:
identify, subsequent to engaging in the ABS streaming session using the multiple first URIs, the second bitrate for the ABS streaming session, wherein the retrieving the second sequence of multiple second URIs, and the second sponsorship signature, from the manifest file is based on the identified second bitrate.

17. A non-transitory storage medium storing instructions executable by a computational device, wherein the instructions comprise instructions to cause the computational device to:
retrieve, from a campaign portal that stores information regarding toll-free or reduced toll data campaigns for content hosted by content servers, a manifest file associated with streaming content, wherein the manifest file includes a first sequence of multiple first Uniform Resource Identifiers (URIs) that identify first network storage locations of multiple first content segments of the streaming content that correspond to a first bitrate, and wherein a first sponsorship signature of multiple sponsorship signatures is appended to at least one of the multiple first URIs of the manifest file;
retrieve the multiple first URIs, and the first sponsorship signature, from the manifest file;
cause the first sponsorship signature to be sent to a charging node in a Public Land Mobile Network (PLMN) for controlling the charging of data delivery associated with the streaming content to one of a user of the computational device or a sponsor of the streaming content based on the first sponsorship signature, wherein the charging node determines whether a campaign associated with the first sponsorship signature is currently valid;
determine whether a bitrate associated with the computational device has changed from the first bitrate to a second bitrate;
when the bitrate associated with computational device has changed from the first bitrate to the second bitrate:
retrieve, from the campaign portal, a second sequence of multiple second URIs that identify second network storage locations of multiple second content segments of the streaming content that correspond to the second bitrate; and
engage, via the PLMN using the multiple first URIs, in a content streaming session to receive the streaming content when the bitrate associated with the computational device has not changed from the first bitrate to the second bitrate.

18. The non-transitory storage medium of claim 17, wherein each of the multiple sponsorship signatures is associated with a different one of multiple sponsorship discount factors.

19. The non-transitory storage medium of claim 18, wherein the instructions comprise instructions to cause the computational device to:
determine a first sponsorship discount factor, of the multiple sponsorship discount factors, that corresponds to the first sponsorship signature, and
wherein controlling the charging of data delivery associated with the streaming content to the one of the user of the computational device or the sponsor of the streaming content is further based on the first sponsorship discount factor.

20. The non-transitory storage medium of claim 19, wherein, when controlling the charging of data delivery, the instructions comprise instructions to cause the computational device to:
allocate a first portion of the data delivery associated with the streaming content to the user of the computational device in accordance with the first sponsorship discount factor; and
allocate a second portion of the data associated with the streaming content to the sponsor of the streaming content in accordance with the first sponsorship discount factor.

* * * * *